Figure 1:
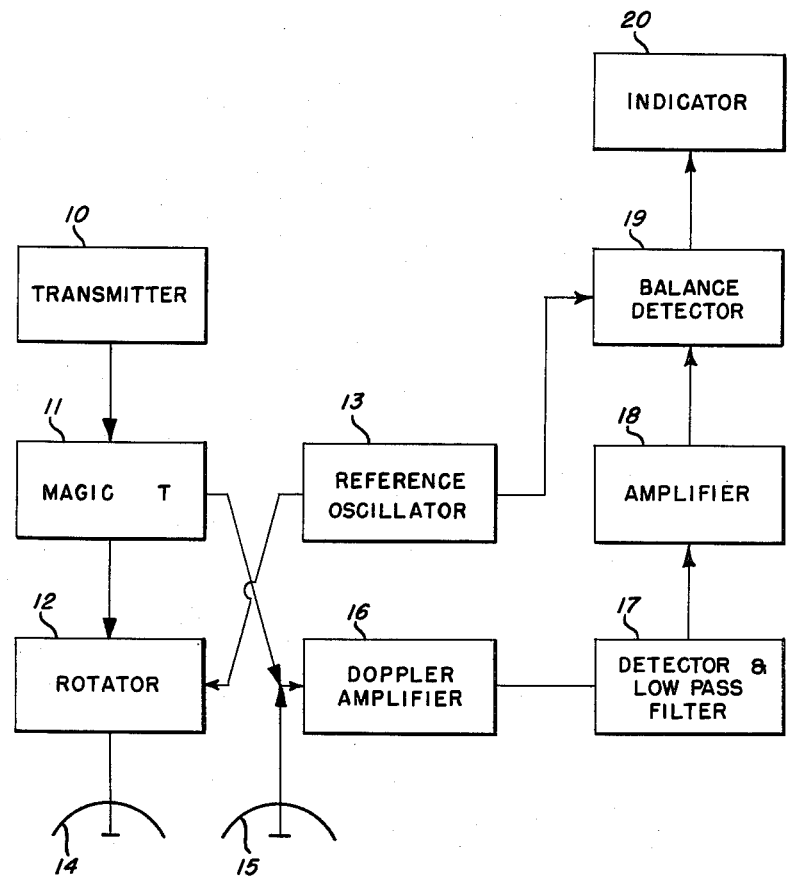

Jan. 9, 1962  K. M. KRAMP  3,016,529
SYSTEMS FOR THE MEASUREMENT OF SEA STATE AND THE LIKE
Filed Sept. 30, 1958  2 Sheets-Sheet 1

INVENTOR
KURT M. KRAMP
BY *H. Vincent Harsha*
ATTORNEY

INVENTOR
KURT M. KRAMP
BY Robert F. O'Connell
ATTORNEY

United States Patent Office 3,016,529
Patented Jan. 9, 1962

3,016,529
SYSTEMS FOR THE MEASUREMENT OF SEA STATE AND THE LIKE
Kurt M. Kramp, Lexington, Mass., assignor to Raytheon Company, a corporation of Delaware
Filed Sept. 30, 1958, Ser. No. 764,437
13 Claims. (Cl. 343—5)

This invention relates to radio frequency systems and more particularly to the measurement of the scattering properties of a radio reflecting surface.

While not limited thereto, the present invention is intended for use, primarily, as an airborne sea state indicator. The present invention is especially useful for obtaining landing information for sea planes and to determine sea state for any one of the marine functions performed by helicopters such as for example, rescue operations, sonar dunking and the like.

With regard to the transmission of radio frequency energy, for distance and velocity measuring systems and the like, an isotropic reflector scatters radio frequency energy non-directively with random polarization and a properly oriented plane reflector acts as a mirror with practically perfect reflection in the same radio frequency polarization as that of the transmitted energy. For example, the condition of the surface of the sea, generally referred to as sea state, varies from a rough to a smooth condition, hence, if the surface of the sea is rough it will act as an isotropic reflector to radio frequency signals and if the surface of the sea is smooth it will act as a mirror with practically perfect reflection capability and with no polarization scattering. A system which has its receiver cross polarized from the transmitter depends entirely upon random scattering from the reflecting surface for its received power, the incident angle $\gamma$ at the reflecting surface being relatively unimportant, while a plane-polarized system with an incident angle $\gamma$ of about 90° is dependent upon direct reflection from the reflecting surface for its received power. Inasmuch as a plane-polarized system also depends on radio frequency energy scattering for obtaining received power as $\gamma$ approaches 0°, the incident angle $\gamma$ must be large or, preferably, approach 90° for maximum reception of reflected power.

In view of the above it may now be apparent that a radio frequency system which is capable of properly monitoring and comparing the scattering and reflecting properties of a sufficiently large reflector will be able to define the type or degree of irregularity of the surface being irradiated by R.F. or radio frequency energy.

It is, therefore, the main object of the present invention to provide a new and novel means and method for measuring sea state and the like.

It is a further object of the present invention to provide a means and method for measuring sea state that is independent of weather, altitude and service maintenance.

According to the preferred embodiment of the present invention a radar or radio-frequency system, wherein wave energy is transmitted and wherein returned energy is utilized, is characterized in that the system is adapted to be effectively alternately plane-polarized and cross-polarized to provide certain characteristics of the utilized signal, as more completely explained hereinafter, that is a function of both direct reflection and scattering to provide an amplitude modulated signal. The returned signal is thereafter monitored by the same receiver and detection circuits, the modulation of the returned signal being inversely proportional to the roughness of the sea.

In the preferred embodiment shown and described herein the polarization of the transmitted energy is rotated at a relatively slow rate, as compared to a standard circular polarized system whose energy rotates at the transmitter frequency so that a fixed polarized receiver first sees plane-polarized energy due to direct reflection and then sees cross-polarized energy due to scattering.

As used herein a plane-polarized system is one in which the R.F. polarization of the transmitter and receiver is the same, a cross-polarized system is one in which the R.F. polarization of the receiver is polarized 90° from the transmitter or vice versa, plane-polarized energy is energy due to direct reflection, and cross-polarized energy is energy due to scattering.

Various efficient methods of carrying the desired information are available, such as, for example, Doppler return due to aircraft velocity or the methods used in radio altimeters. The output signal of the receiver or receiving antenna is basically an amplitude modulated R.F. signal and regardless of the method or apparatus used to process the received signal, the output signal of such apparatus is an amplitude modulated wave having a modulation frequency equal to the rotation rate of the transmitted energy. The amplitude modulation referred to immediately hereinabove is due to first looking at the direct reflection characteristics of the sea (receiving plane polarized energy) which results in a maximum signal level and then at the scattering characteristics of the sea (receiving cross-polarized energy) which results in a lower or minimum signal level. The amplitude variation of the receiver output signal is inversely proportional to the roughness of the sea, hence, for example, a D.C. output signal or the like for actuating any suitable indicating device may be derived therefrom, the magnitude of the D.C. signal being likewise inversely proportional to the roughness of the sea. The fact that both direct reflection and scattering are received and monitored by the same receiver and detection circuits results in a system the operation of which is independent of weather and altitude and substantially independent of service maintenance.

In the accompanying specification there is shown and described an illustrative embodiment of the present invention. It is, however, to be clearly understood that I do not wish to be limited to the details herein shown and described for purposes of illustration only, inasmuch as changes and modifications therein may be made without the exercise of invention and within the true spirit and scope of the claims hereto appended.

Figure 2:
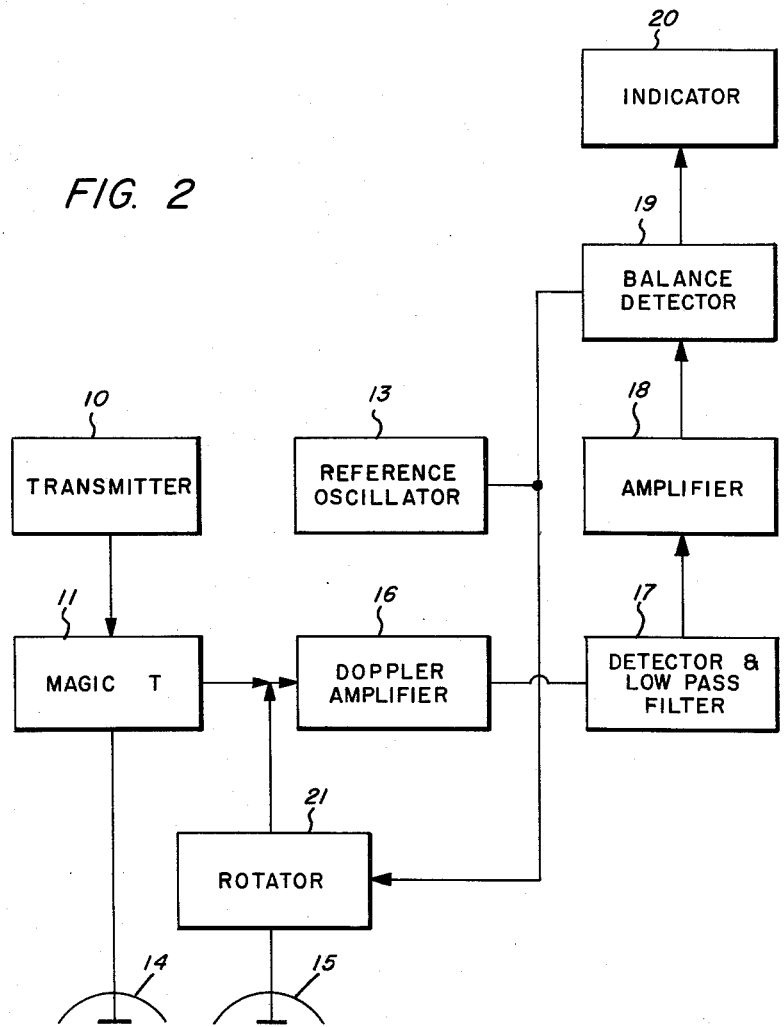

FIG. 1 is a block diagram of a radio frequency system assembled in accordance with one embodiment of the invention; and FIG. 2 is a block diagram of a radio frequency system assembled in accordance with another embodiment of the invention.

Referring now in detail to FIGURE 1, the numeral 10 designates a conventional radio transmitter adapted to generate radio or ultra high frequency oscillations. The output of the transmitter is conveyed to a "magic T" 11 or any other suitable device capable of isolating the transmitter 10 from the receiving antenna. From the "magic T" 11 the transmitter output is conveyed to a conventional ferrite rotator 12 or other phase shifting device capable of continuously varying the polarization of the transmitted signal through 360°. By way of example, a suitable ferrite rotator may be comprised of a ferrite slug carried in a waveguide and surrounded by a coil in a manner well known in the art, the coil being supplied with current from a suitable sine wave source, such as, for example, a reference oscillator 13 having a resonant frequency equal to that of the desired rate of rotation. A satisfactory rate of rotation is 200 c.p.s. although a lesser or substantially greater rate may be selected if desired. Although the use of a ferrite rotator having a rate of polarization rotation less than the transmitting frequency is preferred as the most expedient means of rendering the systems alternately plane-polarized and cross-polarized, it is to be understood that the rotator need not necessarily be located in the transmitting antenna waveguide or transmission line and that other suitable means may be used which will, for example, obtain the same result or, alternately, vary the polarization through only about 90° which will effectively plane-polarize and cross-polarize the system. For example, the transmitter may be plane-polarized and the polarization of the received transmitted energy varied at a rate substantially less than the transmitting frequency. Such a system is shown in the alternative embodiment of FIG. 2. Further, a single antenna may be substituted for the transmitting and receiving antennas in a manner well known in the art. From the rotator 12 the transmitter output is conveyed to an appropriate antenna 14 for directionally radiating the same into space. The radiating antenna 14 is preferably adapted to be at a large angle to the sea or reflecting surface that it is desired to inspect. As is well known, a portion of the transmitting energy will be reflected and subsequently intercepted, back at the site of the original transmission by the receiving antenna 15.

The reflected signal or echo is conveyed through the receiving antenna 15 to a Doppler amplifier 16 which is a conventional amplifier having a band pass of, for example, 100 c.p.s.–20,000 c.p.s. and in addition to being receptive of the reflected signal, also is receptive through the "magic T" 11 of a small portion of the output of the transmitter 10 whereby the reflected signal comprises Doppler return as the information carrier. When the invention is carried in an aircraft as is assumed to be the case herein, a Doppler signal will be developed as described hereinabove which is amplitude modulated by the reflecting surface at a rate equal to the ferrite rotation rate.

The Doppler frequency is determined by the velocity of the aircraft, transmitting frequency and the angle of incidence of the received signal. The Doppler signal thus obtained is supplied to the Doppler amplifier 16 having a band pass sufficient to pass the maximum expected Doppler frequency.

The output signal of the Doppler amplifier 16 is applied to a combined conventional detector and low pass filter 17 to remove the carrier signal. The output signal of the detector portion will contain the Doppler frequency and some of the carrier; hence, the low pass filter portion is selected to have a suitable cut-off frequency to remove any of the carrier that may still be present at the output of the detector portion. The varying voltage from the low pass filter is supplied to a conventional amplifier 18 the output of which in turn is supplied to a conventional balance detector 19 which may be comprised of two diodes adapted to receive the output signal of the amplifier 18 and a reference signal from the reference oscillator 13 whereby when both signals are in phase, as is always the case for the preferred embodiment, an output will be obtained, the magnitude of which is substantially determined by the amplitude of the output signal of the amplifier 18. The D.-C. output signal of the balance detector 19 is inversely proportional to sea state or the roughness of the reflecting surface and is supplied to a conventional indicator 20 such as, for example, a D.-C. voltmeter calibrated in terms of the roughness of the reflecting surface.

It may now be apparent that, regardless of the method used to carry the information, the output signal of the receiver or receiving antenna 15 will be an amplitude modulated wave modulated at the rate of rotation of the transmitted energy. The amplitude modulation is due to first looking at the direct reflection characteristics (plane-polarization) and then at the scattering characteristics (cross-polarization) of the sea or reflecting surface, the amplitude variation of any resultant output signal or voltage derived from the received signal being inversely proportional to the roughness of the sea or reflecting surface. It is to be understood that the present invention is not limited to the specific embodiment described herein since, for example, altitude information derived from a conventional radio altimeter may be easily adapted in accordance with the inventive concept to be processed in the usual manner and additionally carry the desired information and produce the desired indication.

FIG. 2 shows an alternative embodiment of the invention wherein the received signal from antenna 15 is applied to a rotator 21 so that the polarization of the received energy can be varied at a rate substantially less than the transmitting frequency. In this case the transmitted frequency signal is applied directly to the transmitting antenna 14 from magic-T 11. In FIG. 2, therefore, the reference oscillator 13 is connected to the rotator in the receiving circuit. Other components in FIG. 2 have reference numerals that correspond to the components shown in FIG. 1.

Other objects and advantages of the present invention will readily occur to those skilled in the art to which the same relates.

What is claimed is:

1. In a radio frequency system having directional transmitting and receiving means the combination comprising: means for alternately plane-polarizing and cross-polarizing said system at a rate less than the transmitting frequency for producing an amplitude modulated first signal at the output of said receiving means; means actuated by said first signal for producing a second signal proportional to amplitude variation of said first signal; and indicator means actuated by said second signal for indicating the roughness of a reflecting surface.

2. In a radio frequency system the combination comprising: means for transmitting wave energy; means having output terminals for receiving returned transmitted energy; means for alternately plane-polarizing and cross-polarizing said system wherein the polarization of one of said aforementioned means is fixed and the other is varied for producing at said receiver means output terminals an amplitude modulated first output signal; and means actuated by said modulated first output signal for producing a second output signal proportional to amplitude variation of said first output signal.

3. The combination as defined in claim 2 wherein said means for receiving returned transmitted energy is plane-polarized and the polarization of said transmitted energy is varied at a rate substantially less than the transmitting frequency whereby said system is rendered alternately plane-polarized and cross-polarized.

4. The combination as defined in claim 2 wherein said transmitting means is plane-polarized and the polarization of said received transmitted energy is varied at a rate substantially less than the transmitting frequency.

5. In a radio frequency system the combination comprising: means for directionally transmitting wave energy; receiving means having a fixed polarization for receiving returned transmitted energy; means for continuously varying the polarization of the transmitted energy through at least 90° for producing an amplitude modulated first signal at the output of said receiving means; and means actuated by said modulated signal for producing a second signal proportional to amplitude variation of said modulated signal.

6. In a radio frequency system the combination comprising: means for transmitting wave energy; means for varying the polarization of the said transmitted energy; receiving means for receiving returned transmitted energy, said receiving means having a fixed polarization for producing an amplitude modulated first output signal; and means actuated by said first output signal for producing a second output signal proportional to amplitude variation of said modulated output signal.

7. The combination as described in claim 6 wherein said system is alternately substantially plane-polarized and cross-polarized and the amplitude of said modulated output signal is inversely proportional to the roughness of a reflecting surface.

8. In a radio frequency system the combination comprising: generating means for producing wave energy having a predetermined frequency; a transmitting antenna for radiating wave energy; a plane-polarized receiving antenna for receiving returned energy; an amplifier having input terminals connected to said receiving antenna; means for supplying said wave energy to said transmitting antenna and a portion of said wave energy to said amplifier input terminals; a first detector circuit for detecting the output signal of said amplifier; means for continuously varying the polarization of wave energy supplied to said transmitting antenna at a rate less than said predetermined frequency, said means including a ferrite rotator and an oscillator for controlling the rate of polarization rotation; and a second detector circuit connected to said oscillator and said first detector circuit for producing a signal proportional to amplitude variation of the output signal of said amplifier.

9. In a radio frequency system the combination comprising: generating means for producing wave energy having a predetermined frequency; a transmitting antenna for radiating wave energy; a plane-polarized receiving antenna for receiving returned energy; an amplifier having input terminals connected to said receiving antenna; means for supplying said wave energy to said transmitting antenna and a portion of said wave energy to said amplifier input terminals; means including a ferrite rotator and an oscillator for continuously varying the polarization of wave energy supplied to said transmitting antenna whereby wave energy supplied to the said amplifier from said receiving antenna is amplitude modulated; a detector circuit connected to said amplifier for receiving the output of said amplifier; and a balance detector circuit connected to said oscillator and said first detector circuit for producing an output voltage proportional to amplitude variation of said wave energy supplied to said amplifier from said receiving antenna.

10. A method of measuring sea state which includes the steps of: directing wave energy toward the surface of the water; varying the polarization of said wave energy; alternately receiving returned energy substantially due to respectively reflection and scattering; deriving from said received energy an output voltage proportional to amplitude variations of said received signals; and applying said voltage to indicator means for indicating the magnitude of said voltage in terms of sea state.

11. A method of measuring sea state which includes the steps of: directing at a substantial angle wave energy of at least radio frequency toward the surface of the water; varying the polarization of said wave energy; deriving from returned wave energy an amplitude modulated signal the modulation of which is proportional to reflected and scattered energy; deriving from said modulated signal a voltage proportional to amplitude variation of said modulated signal and inversely proportional to the sea state; and applying said voltage to indicator means for indicating the magnitude of said voltage in terms of sea state.

12. A method of measuring sea state which includes the steps of: directing wave energy toward the surface of the water; varying the polarization of said wave energy; deriving from returned energy an amplitude modulated signal the modulation of which is alternately proportional to the signal scattering and signal reflecting properties of the water; deriving from said modulated signal a voltage proportional to the amplitude variation of said modulated signal; and applying said voltage to indicator means for indicating the magnitude of said voltage in terms of sea state.

13. A method of measuring sea state which includes the steps of: directing at a substantial angle wave energy of at least radio frequency toward the surface of the water; varying the polarization of the transmitted wave energy continuously through at least 90°; deriving from returned energy an amplitude modulated signal the modulation of which is proportional to plane-polarized and cross-polarized energy; deriving from said modulated signal a voltage proportional to amplitude variation of said modulated signal and inversely proportional to the sea state; and applying said voltage to indicator means for indicating the magnitude of said voltage in terms of sea state.

References Cited in the file of this patent

UNITED STATES PATENTS

| | | |
|---|---|---|
| 2,421,028 | King | May 27, 1947 |
| 2,472,212 | Hudspeth | June 7, 1949 |
| 2,483,790 | Stanko | Oct. 4, 1949 |
| 2,508,571 | Hudspeth | May 23, 1950 |
| 2,540,536 | Lindenblad | Feb. 6, 1951 |
| 2,658,991 | O'Brien et al. | Nov. 10, 1953 |